United States Patent
Jeon et al.

(10) Patent No.: US 12,045,721 B2
(45) Date of Patent: Jul. 23, 2024

(54) METHOD AND DEVICE FOR TRANSMITTING OFDM SIGNAL, AND METHOD AND DEVICE FOR RECEIVING OFDM SIGNAL

(71) Applicants: LG Electronics Inc., Seoul (KR); The University of Hong Kong, Hong Kong (CN)

(72) Inventors: Kijun Jeon, Seoul (KR); Kaibin Huang, Hong Kong (CN); Dingzhu Wen, Hong Kong (CN); Sangrim Lee, Seoul (KR); Sungjin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 351 days.

(21) Appl. No.: 17/496,866

(22) Filed: Oct. 8, 2021

(65) Prior Publication Data

US 2022/0114448 A1    Apr. 14, 2022

(30) Foreign Application Priority Data

Oct. 8, 2020   (KR) .................. 10-2020-0130054

(51) Int. Cl.
*H04L 41/16*   (2022.01)
*G06N 3/08*   (2023.01)
(Continued)

(52) U.S. Cl.
CPC ............... *G06N 3/08* (2013.01); *H04L 41/16* (2013.01); *H04W 24/02* (2013.01); *H04W 24/10* (2013.01)

(58) Field of Classification Search
CPC .......... G06N 3/08; G06N 3/045; H04L 41/16; H04L 41/145; H04W 24/02; H04W 24/10
(Continued)

(56) References Cited

U.S. PATENT DOCUMENTS

| 11,246,173 B2* | 2/2022 | Vahdat | H04B 7/0452 |
| 11,741,361 B2* | 8/2023 | Zheng | H04L 41/145 |
| | | | 706/26 |

(Continued)

OTHER PUBLICATIONS

Radio Resource Allocation in 5G New Radio: A Neural Networks Approach; Madyan Alsenwi, Nov. 2019 (Year: 2019).*

(Continued)

*Primary Examiner* — Hirdepal Singh
(74) *Attorney, Agent, or Firm* — BRYAN CAVE LEIGHTON PAISNER LLP (57) ABSTRACT

In a neural network (NN) based wireless communication system, a BS determines, for an one-round latency T and an overall model size L of the NN model, i) $T_u$ that makes $\hat{L}^*(T_u)$ larger than L and ii) $T_l$ that makes $\hat{L}^*(T_l)<L$; repeats determining $\hat{L}^*(T_m)$, $\{R^*_{k,n}\}$, $\{\hat{L}^*_k\}$, and $\{C^*_{k,n}\}$ by using $T_m=(T_u+T_l)/2$ for k=1, K, and n=1, . . . N, while $T_u$ is different from $T_l$; allocates NN model parameters to user equipments 1 to K based on $\{R^*_{k,n}\}$, $\{L^*_k\}$, and $\{C^*_{k,n}\}$ determined based on $T_m$ when $T_u=T_l$; and updates the NN model based on update results of the NN model parameters received from user equipments 1 to K.

12 Claims, 5 Drawing Sheets

(51) Int. Cl.
*H04W 24/02* (2009.01)
*H04W 24/10* (2009.01)

(58) Field of Classification Search
USPC .......................................................... 455/418
See application file for complete search history.

(56) References Cited

U.S. PATENT DOCUMENTS

2021/0075691 A1* 3/2021 Zeng ........................ H04L 1/203
2023/0319617 A1* 10/2023 Manolakos ........... H04W 24/10
370/328
2023/0325679 A1* 10/2023 Wang ...................... G06N 3/045
706/25

OTHER PUBLICATIONS

Joint Device Scheduling and Resource Allocation for Latency Constrained Wireless Federated Learning), Wenqi Shi; Jul. 2020. (Year: 2020).*

* cited by examiner

METHOD AND DEVICE FOR TRANSMITTING OFDM SIGNAL, AND METHOD AND DEVICE FOR RECEIVING OFDM SIGNAL

CROSS-REFERENCE TO RELATED APPLICATIONS

This application claims the benefit of an earlier filing date and right of priority to Korean Patent Application No. 10-2020-0130054 filed on Oct. 8, 2020. The disclosure of the prior application is considered part of and is incorporated by reference in the disclosure of this application.

TECHNICAL FIELD

The present disclosure relates to a wireless communication system.

BACKGROUND

Modern communication systems supporting high-rate systems (e.g., LTE and 5G) are usually operated over broadband channels. In such systems, orthogonal frequency-division multiplexing (OFDM) is widely adopted to partition a spectrum into subcarriers to simplify signal processing and facilitate resource allocation.

Recent years have witnessed growing interests in the deployment of artificial intelligence (AI) algorithms at the network edge, known as edge learning. Deploying machine learning algorithms at the network edge enables low-latency access to distributed data and computation resources, resulting in an active research area called edge learning.

Wireless communication systems will become more demanding for edge learning. Efficient training methods for wireless communication systems are required to minimize the learning latency while minimizing the transmit power when guaranteeing the data rages of all users or maximizing the throughput under power control.

SUMMARY

The object of the present disclosure can be achieved by techniques disclosed herein for training a neural network (NN) model in a neural network (NN) based wireless communication system.

In one aspect, provided is a method for updating a neural network (NN) model in a neural network (NN) based wireless communication system. The method comprises: determining, for an one-round latency T and an overall model size L of the NN model, i) $T_u$ that makes $\hat{L}^*(T_u)$ larger than L and ii) $T_l$ that makes $\hat{L}^*(T_l)<L$; determining $\hat{L}^*(T_m)$, $\{R^*_{k,n}\}$, $\{L^*_k\}$, and $\{C^*_{k,n}\}$ by setting $T_m=(T_u+T_l)/2$ based on $T_u$ being different from $T_l$, where k=1, ..., K, n=1, ..., N, $R^*_{k,n}$ is channel capacity of user equipment k on subcarrier n, $L^*_k$ is parameter allocation to user equipment k, and $C^*_{k,n}$ is subcarrier allocation indicator for user equipment k; determining $T_u=T_m$ based on $\hat{L}^*(T_m)$ being equal to or larger than L and determining $T_l=T_m$ based on $\hat{L}^*(T_m)$ being smaller than L; repeating determining $\hat{L}^*(T_m)$, $\{R^*_{k,n}\}$, $\{L^*_k\}$, and $\{C^*_{k,n}\}$, where $T_m=(T_u+T_l)/2$ based on $T_u$ being different from $T_l$; outputting $\{R^*_{k,n}\}$, $\{L^*_k\}$, and $\{C^*_{k,n}\}$, based on $T_u$ being equal to $T_l$; allocating NN model parameters to user equipments 1 to K based on the output $\{R^*_{k,n}\}$, and $\{L^*_k\}$, and $\{C^*_{k,n}\}$; receiving update results of the NN model parameters from user equipments 1 to K; and updating the NN model based on the received update results.

In another aspect, provided is a base station for updating a neural network (NN) model in a neural network (NN) based wireless communication system. The base station comprises: at least one transceiver; at least one processor; and at least one memory storing at least one instruction that, when executed, causes the at least one processor to perform operations. The operations comprise: determining, for an one-round latency T and an overall model size L of the NN model, i) $T_u$ that makes $\hat{L}^*(T_u)$ larger than L and ii) $T_l$ that makes $\hat{L}^*(T_l)<L$; determining $\hat{L}^*(T_m)$, $\{R^*_{k,n}\}$, $\{L^*_k\}$, and $\{C^*_{k,n}\}$ by setting $T_m=(T_u+T_l)/2$ based on $T_u$ being different from $T_l$, where k=1, ..., K, n=1, ..., N, $R^*_{k,n}$ is channel capacity of user equipment k on subcarrier n, $L^*_k$ is parameter allocation to user equipment k, and $C^*_{k,n}$ is subcarrier allocation indicator for user equipment k; determining $T_u=T_m$ based on $\hat{L}^*(T_m)$ being equal to or larger than L and determining $T_l=T_m$ based on $\hat{L}^*(T_m)$ being smaller than L; repeating determining $\hat{L}^*(T_m)$, $\{R^*_{k,n}\}$, $\{L^*_k\}$, and $\{C^*_{k,n}\}$, where $T_m=(T_u+T_l)/2$ based on $T_u$ being different from $T_l$; outputting $\{R^*_{k,n}\}$, $\{L^*_k\}$, and $\{C^*_{k,n}\}$, based on $T_u$ being equal to $T_l$; allocating NN model parameters to user equipments 1 to K based on the output $\{R^*_{k,n}\}$, and $\{L^*_k\}$, and $\{C^*_{k,n}\}$; receiving update results of the NN model parameters from user equipments 1 to K; and updating the NN model based on the received update results In each aspect of the present disclosure, determining $\hat{L}^*(T_m)$, $\{R^*_{k,n}\}$, $\{L^*_k\}$, and $\{C^*_{k,n}\}$ may comprise: determining $\{C^*_{k,n}\}=0$ based on $I_{k,n}$ being larger than $\mu_n$; determining $\{C^*_{k,n}\} \in (0,1)$ based on $I_{k,n}$ being equal to $\mu_n$ for multiple user equipments; and determining $\{C^*_{k,n}\}=1$ based on $I_{k,n}$ being equal to $\mu_n$ for a single user equipment, wherein $$\mu_n = \min_k I_{k,n}, \text{ and wherein } I_{k,n} = \frac{v_k \sigma^2}{h_{k,n}}\left[\left(2^{R^*_{k,n}/B} - 1\right) - \frac{R^*_{k,n} 2^{R^*_{k,n}/B} \ln 2}{B}\right],$$

where B is a system bandwidth of a cell, $h_{k,n}$ is an uplink channel gain of user equipment k on subcarrier n, and $\sigma^2$ is additive white Gaussian noise power.

In each aspect of the present disclosure, determining $\hat{L}^*(T_m)$, $\{R^*_{k,n}\}$, $\{L^*_k\}$, and $\{C^*_{k,n}\}$ may comprise: determining $\{R^*_{k,n}\}$ based on $$R^*_{k,n} = B \log_2\left(\frac{\lambda_k B}{v_k \tau \ln 2}\right) + B \log_2\left(\frac{h_{k,n}}{\sigma^2}\right) \qquad \text{i)}$$

for all $C_{k,n} \neq 0$, and ii) $R^*_{k,n}=0$ for all $C_{k,n}=0$, wherein $h_{k,n}$ is an uplink channel gain of user equipment k on subcarrier n, $\lambda_k$ and $v_k$ are Lagrange multipliers, and $\tau$ is the number of bits per NN model parameter.

In each aspect of the present disclosure, determining $\hat{L}^*(T_m)$, $\{R^*_{k,n}\}$, $\{L^*_k\}$, and $\{C^*_{k,n}\}$ may comprise: determining $\{L^*_k\}$ based on $L^*_k=[T-\sqrt{\lambda_k T_m + v_k g_k f_k^2 T_m - v_k(P_k T_m - \xi)/f_k}]f_k$, wherein $\xi$ is circuit energy consumption, $g_k$ computation power factor of user equipment k, $g_k$ is computation frequency of user equipment k, and $P_k$ is permitted energy consumption of user equipment k.

In each aspect of the present disclosure, $\hat{L}^*(T_m)$ may be determined as follows: $\hat{L}^*(T_m)=\Sigma_{k=1}^{K} L^*_k$.

In each aspect of the present disclosure, determining $\hat{L}^*(T_m)$, $\{R^*_{k,n}\}$, $\{L^*_k\}$, and $\{C^*_{k,n}\}$ may comprise: i) allocating $w_{g,i}$ to only one user equipment, where $w_{g,i}$ is the i-th neuron parametric vector in layer g of the NN model;

and ii) allocating $Z_m=[z_{1,m}, \ldots, z_{g,m}, \ldots, z_{G,m}]$ to only one user equipment, where $Z_m$ is an auxiliary matrix for data sample m, $z_{g-1,m}=[z_{g-1,1,m}, z_{g-1,2,m}, \ldots, z_{g,I_{g-1},m}]^T$ is an auxiliary variable vector for layer (g−1) regarding data sample m, and $I_{g-1}$ is the number of neurons in the (g−1)-th layer of the NN model.

The above technical solutions are merely some parts of the implementations of the present disclosure and various implementations into which the technical features of the present disclosure are incorporated can be derived and understood by persons skilled in the art from the following detailed description of the present disclosure.

BRIEF DESCRIPTION OF DRAWINGS

The accompanying drawings, which are included to provide a further understanding of the present disclosure, illustrate examples of implementations of the present disclosure and together with the detailed description serve to explain implementations of the present disclosure.

DETAILED DESCRIPTION

Hereinafter, implementations according to the present disclosure will be described in detail with reference to the accompanying drawings. The detailed description, which will be given below with reference to the accompanying drawings, is intended to explain exemplary implementations of the present disclosure, rather than to show the only implementations that may be implemented according to the present disclosure. The following detailed description includes specific details in order to provide a thorough understanding of the present disclosure. However, it will be apparent to those skilled in the art that the present disclosure may be practiced without such specific details.

In some instances, known structures and devices may be omitted or may be shown in block diagram form, focusing on important features of the structures and devices, so as not to obscure the concept of the present disclosure. The same reference numbers will be used throughout the present disclosure to refer to the same or like parts.

A technique, a device, and a system described below may be applied to a variety of wireless multiple access systems. The multiple access systems may include, for example, a code division multiple access (CDMA) system, a frequency division multiple access (FDMA) system, a time division multiple access (TDMA) system, an orthogonal frequency division multiple access (OFDMA) system, a single-carrier frequency division multiple access (SC-FDMA) system, a multi-carrier frequency division multiple access (MC-FDMA) system, etc. CDMA may be implemented by radio technology such as universal terrestrial radio access (UTRA) or CDMA2000. TDMA may be implemented by radio technology such as global system for mobile communications (GSM), general packet radio service (GPRS), enhanced data rates for GSM evolution (EDGE) (i.e., GERAN), etc. OFDMA may be implemented by radio technology such as institute of electrical and electronics engineers (IEEE) 802.11 (Wi-Fi), IEEE 802.16 (WiMAX), IEEE 802.20, evolved-UTRA (E-UTRA), etc. UTRA is part of universal mobile telecommunications system (UMTS) and 3rd generation partnership project (3GPP) long-term evolution (LTE) is part of E-UMTS using E-UTRA. 3GPP LTE adopts 01-DMA on downlink (DL) and adopts SC-FDMA on uplink (UL). LTE-advanced (LTE-A) is an evolved version of 3GPP LTE.

For convenience of description, description will be given under the assumption that the present disclosure is applied to 3GPP based wireless communication systems. However, the technical features of the present disclosure are not limited thereto. For example, although the following detailed description is given based on mobile communication systems corresponding to 3GPP based wireless communication systems, the mobile communication systems are applicable to other arbitrary mobile communication systems except for matters that are specific to the 3GPP based wireless communication systems.

For terms and techniques that are not described in detail among terms and techniques used in the present disclosure, reference may be made to 3GPP based wireless communication standard specifications and the following documents 1 to 9.

Document 1) G. Zhu, D. Liu, Y. Du, C. You, J. Zhang, and K. Huang, "Toward an intelligent edge: Wireless communication meets machine learning," IEEE Commun. Magazine, vol. 58, pp. 19-25, January 2020.

Document 2) D. Wen, M. Bennis, and K. Huang, "Joint parameter-and-bandwidth allocation for improving the efficiency of partitioned edge learning," to appear in IEEE Trans. Wireless Commun., 2020.

Document 3) W. Y. B. Lim, N. C. Luong, D. T. Hoang, Y. Jiao, Y.-C. Liang, Q. Yang, D. Niyato, and C. Miao, "Federated learning in mobile edge networks: A comprehensive survey," [Online]. Available: https://arxiv.org/pdf/1909.11875.pdf, 2019.

Document 4) G. Zhu, Y. Wang, and K. Huang, "Broadband analog aggregation for low-latency federated edge learning," IEEE Trans. Wireless Commun., vol. 19, pp. 491-506, October 2019.

Document 5) Y. Du, S. Yang, and K. Huang, "High-dimensional stochastic gradient quantization for communication-efficient edge learning," IEEE Trans. on Signal Process., vol. 68, pp. 2128-2142, 2020.

Document 6) M. Carreira-Perpinan and W. Wang, "Distributed optimization of deeply nested systems," in Proc. of Intl. Workshop on Artificial Intelligence and Statistics (AISTATS), (Reykjavik, Iceland), April 2014.

Document 7) C. Y. Wong, R. S. Cheng, K. B. Lataief, and R. D. Murch, "Multiuser OFDM with adaptive subcarrier, bit, and power allocation," IEEE J. Sel. Areas Commun., vol. 17, no. 10, pp. 1747-1758, 1999.

Document 8) J. Jang and K. B. Lee, "Transmit power adaptation for multiuser OFDM systems," IEEE J. Sel. Areas Commun., vol. 21, no. 2, pp. 171-178, 2003.

Document 9) C. You, K. Huang, H. Chae, and B.-H Kim, "Energy-efficient resource allocation for mobile-edge computation offloading," IEEE Trans. Wireless Commun., vol. 16, no. 3, pp. 1397-1411, 2016.

In the present disclosure, a user may be fixed or mobile. Each of various devices that transmit and/or receive user data and/or control information by communicating with a base station (BS) may be a user equipment (UE). The term UE may be referred to as terminal equipment, mobile station (MS), mobile terminal (MT), user terminal (UT), subscriber station (SS), wireless device, personal digital assistant (PDA), wireless modem, handheld device, etc. In the present disclosure, a BS refers to a fixed station that communicates with a UE and/or another BS and exchanges data and control information with a UE and another BS. The term BS may be referred to as advanced base station (ABS), Node-B (NB), evolved Node-B (eNB), base transceiver system (BTS), access point (AP), processing server (PS), etc. Particularly, a BS of a universal terrestrial radio access (UTRAN) is referred to as an NB, a BS of an evolved-UTRAN (E-UTRAN) is referred to as an eNB, and a BS of new radio access technology network is referred to as a gNB. Hereinbelow, for convenience of description, the NB, eNB, or gNB will be referred to as a BS regardless of the type or version of communication technology.

In the present disclosure, a node refers to a fixed point capable of transmitting/receiving a radio signal to/from a UE or BS. At least one antenna is installed per node. An antenna may refer to a physical antenna port or refer to a virtual antenna or an antenna group. The node may also be called a point.

In the present disclosure, a cell refers to a specific geographical area in which one or more nodes provide communication services. Accordingly, in the present disclosure, communication with a specific cell may mean communication with a BS or a node providing communication services to the specific cell. A DL/UL signal of the specific cell refers to a DL/UL signal from/to the BS or the node providing communication services to the specific cell. A cell providing UL/DL communication services to a UE is especially called a serving cell. Furthermore, channel status/quality of the specific cell refers to channel status/quality of a channel or a communication link generated between the BS or the node providing communication services to the specific cell and the UE.

A 3GPP-based communication system uses the concept of a cell in order to manage radio resources, and a cell related with the radio resources is distinguished from a cell of a geographic area. The "cell" of the geographic area may be understood as coverage within which a node may provide services using a carrier, and the "cell" of the radio resources is associated with bandwidth (BW), which is a frequency range configured by the carrier. Since DL coverage, which is a range within which the node is capable of transmitting a valid signal, and UL coverage, which is a range within which the node is capable of receiving the valid signals from the UE, depend upon a carrier carrying the signal, coverage of the node may also be associated with coverage of the "cell" of radio resources used by the node. Accordingly, the term "cell" may be used to indicate service coverage by the node sometimes, radio resources at other times, or a range that a signal using the radio resources may reach with valid strength at other times. In 3GPP communication standards, the concept of the cell is used in order to manage radio resources. The "cell" associated with the radio resources is defined by a combination of DL resources and UL resources, that is, a combination of a DL component carrier (CC) and a UL CC. The cell may be configured by the DL resources only or by the combination of the DL resources and the UL resources.

In the present disclosure, a UE, a BS or a server may include at least one processor and at least one memory and additionally further include at least one transceiver. The at least one memory stores instructions that, when executed, cause the at least one processor to perform operations according to some implementations of the present disclosure which are described hereinafter.

The at least one processor may be referred to as controllers, microcontrollers, microprocessors, or microcomputers. The at least one processor may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the at least one processor. The functions, procedures, proposals, and/or methods disclosed in this document may be implemented using firmware or software, and the firmware or software may be configured to include the modules, procedures, or functions. Firmware or software configured to perform the functions, procedures, proposals, and/or methods disclosed in this document may be included in the at least one processor or stored in the at least one memory so as to be driven by the at least one processor. The functions, procedures, proposals, and/or methods disclosed in this document may be implemented using firmware or software in the form of code, commands, and/or a set of command The at least one memory may be connected to the at least one processor and store various types of data, signals, messages, information, programs, code, commands, and/or instructions. The at least one memory may be configured by read-only memories (ROMs), random access memories (RAMs), electrically erasable programmable read-only memories (EPROMs), flash memories, hard drives, registers, cash memories, computer-readable storage media, and/or combinations thereof. The at least one memory may be located at the interior and/or exterior of the at least one processor. The at least one memory 4 may be connected to the at least one processor through various technologies such as wired or wireless connection Conventional design of radio resource management (RRM) in OFDM based broadband systems aim at minimizing the transmit power when guaranteeing the data rates of all users (see e.g., Document 7) or maximizing the throughput under power control (see e.g., Document 8).

Recent years have witnessed growing interests in the deployment of AI algorithms at the network edge, known as edge learning. Deploying machine learning algorithms at the network edge enables low-latency access to distributed data and computation resources, resulting in an active research area called edge learning (see Document 1). Among others, the partitioned edge learning (PARTEL) framework can support the efficient training of a large-scale model using distributed computation resources at mobile devices (see Document 2). In the present disclosure, the methods for implementing PARTEL in broadband systems are described.

For the purpose of the present disclosure, the symbols shown in the following table apply.

TABLE 1

| | | | |
|---|---|---|---|
| B | System bandwidth | $P_k$ | Permitted energy consumption of worker k |
| $C_{k,n}$ | Subcarrier allocation indicator | $P_k^{cmp}$ | Computation power of worker k |
| $E_k$ | Energy consumption of worker k | $P_{k,n}^{com}$ | Uploading power of worker k on subcarrier n |
| $E_{k,n}^{com}$ | Uploading energy of worker k on subcarrier n | $R_{k,n}$ | Channel capacity of worker k on subcarrier n |
| | | T | Overall one round latency of the system |
| $E_k^{cmp}$ | Computation energy of worker k | $T_k$ | One round latency of worker k |
| $f_k$ | Computation frequency | $T_k^{com}$ | Uploading latency of worker k |
| G | Number of layers of the CNN model | $T_{k,n}^{com}$ | Uploading latency of worker k on subcarrier n |
| $g_k$ | Computation power factor | $T_k^{cmp}$ | Computation latency of worker k |
| $h_{k,n}$ | Channel gain | w | Model parameter vector of decomposable models |
| $I_g$ | Number of neurons in layer g | W | Model parameter matrix of CNN models |
| K | Total number of workers | $W_g$ | Parameter matrix of layer g |
| L | Model size | $w_{g,i}$ | Parameter vector of i-th neuron in layer g |
| $L_k$ | Parameters allocation to worker k | Z | Overall auxiliary matrix |
| $L_{k,n}$ | Parameters allocation to worker k on subcarrier n | $z_{g,i,m}$ | Auxiliary variable introduced to i-th neuron in layer g regarding data sample m |
| N | Total number of subcarriers | $Z_{g,m}$ | Auxiliary vector introduced to layer g regarding data sample m |
| $\sigma^2$ | power of additive white Gaussian noise | | |
| $\tau$ | Number of bits per parameter | $Z_m$ | Auxiliary matrix regarding sample m |

For the purpose of the present disclosure, the following abbreviations apply.

RRM: Radio Resource Management
SUPPORT: Subcarrier, Parameter, and Power Allocation
C2: computation-and-communication
PARTEL: Partitioned Edge Learning
FEEL: Federated Edge Learning There exist two paradigms in distributed learning: data parallelism and model parallelism. The former refers to the simultaneous training of an AI model at multiple devices using different parts of a global dataset. On the other hand, model parallelism refers to the simultaneous training of different parts of a model at different devices. Recent research on edge learning focuses on the efficient implementation of different frameworks under these two paradigms.

*Federated Edge Learning (FEEL): FEEL is a popular data-parallelism framework that aims at exploiting distributed mobile data while preserving privacy by avoiding sharing data (see Document 3). The main research focus in FEEL is to overcome the bottleneck by communication-efficient designs that integrate learning and wireless transmission techniques, via designing e.g., simultaneous multi-access technique, called over-the-air computation (see Document 4), gradient quantization (see Document 5), etc.

*PARTEL: PARTEL is a representative model-parallelism framework, which leverages distributed computation resources at devices to train a large-scale model (see Document 2). To this end, the model is partitioned and its parts are allocated to different devices for updating using downloaded datasets. In each round of PARTEL, a server partitions a global model under training into blocks of parameters, called parametric blocks, and allocate each of them to a single device for updating. In other words, PARTEL supports the distributed training of a large-scale AI model by dynamically partitioning the model and allocating the resultant parametric blocks to different devices for updating. Then devices upload the updates to a server where they are assembled and then applied to updating the model. The two steps are iterated till the model converges. The sizes of the parametric blocks determine the computation-and-communication (C2) loads of individual devices. The possibility of controlling the sizes gives rise to a new research issue unique for PARTEL, namely C2 load allocation by model partitioning. Model partitioning in PARTEL is straightforward in the case of decomposable loss functions (e.g., logistic regression). For convolutional neural network (CNN) models with nested layers, their implementation using PARTEL relies on introducing a set of auxiliary variables for the models so as to transform the loss function into a decomposable form (Document 6).

The FEEL framework is less communication efficient than PARTEL, as in the former, each device should upload the updates of the whole parameter vector to the server instead of the updates of only a subset of parameters in the latter.

The existing design for PARTEL targets the frequency non-selective channels (see Document 2). It cannot be straightforwardly extended to practical broadband systems where joint C2 control is more challenging due to frequency selectivity.

The conventional work in OFDM systems targets conventional systems providing radio-access services, the design of broadband RRM in PARTEL systems with computation load balancing is under a new design criterion, namely low learning latency. Among others, some implementations of the present disclosure for C2 resource management have two differences from its conventional counterparts. First, the former needs to account for not only channel states as the latter but also devices' computation capacities. Furthermore, the load allocation in the former is more sophisticated than bit allocation in the latter as it involves model partitioning and has to address relevant issues such as model decomposability. Second, the constraint of synchronized updates in PARTEL tends to bias the RRM to favour devices with relatively weak channels and/or computation capacities. These differences lead to new design challenges for broadband RRM.

The parameter allocation of PARTEL provides a mechanism for controlling computation-and-communication (C2) loads. In the present disclosure, efficient joint management of parameter allocation and radio resources is considered to reduce the learning latency of PARTEL when deployed in a broadband system using orthogonal frequency-division multiplexing (OFDM). Specifically, in some implementations of the present disclosure, for both decomposable models and convolutional neural network (CNN) models, the policies for joint subcarrier, parameter, and power allocation (SUPPORT) are optimized under the criterion of minimum latency.

System Model

Figure 1:
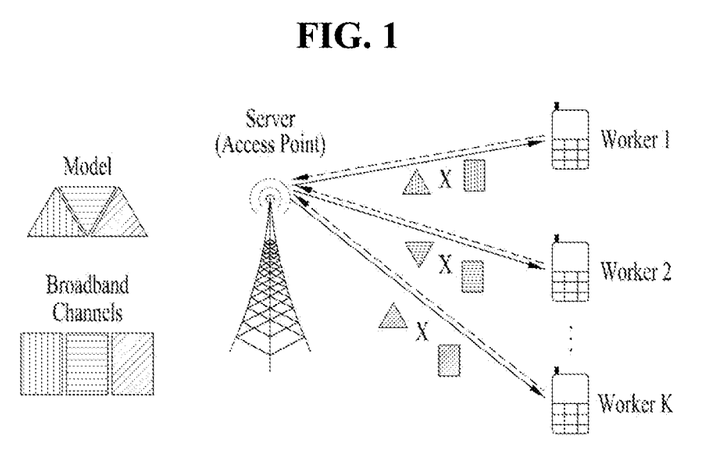
FIG. 1 illustrates an example of PARTEL in broadband system.

FIG. 1 illustrates an example of PARTEL in broadband system. In the example of FIG. 1, a single cell OFDM system is considered. In the cell, there are one server equipped with a single-antenna access point (AP) and K single-antenna edge devices, serving as workers. Each worker (e.g. UE) performs one task assigned by the server. The server is connected to workers via wireless links. The system bandwidth is divided into N orthogonal subcarriers. The bandwidth of each subcarrier is denoted as B. The frequency-selective fading channel is considered, where different subcarriers will experience different channel gains. In the present disclosure, it is assumed that the AP has the channel state information (CSI) of all links that are useful for subcarrier allocation. Besides, the channel gains are assumed to be static in one training iteration but vary over different iterations. The uplink channel gain of worker k on the subcarrier n is denoted as $h_{k,n}$. $\{C_{k,n}\}$ denote the subcarrier allocation indicators. For example, if the n-th subscriber is allocated to worker k, then $C_{k,n}=1$. Otherwise, $C_{k,n}=0$.

Learning Models

In some implementations of the present disclosure, the following learning models may be used.

1) Decomposable Models: The large-scale learning tasks with decomposable objective functions (such as logistic regression) can be directly implemented using PARTEL based on the method of block coordinate descent. A decomposable objective function can be written as $\mathcal{L}(w)=\mathcal{F}(w)+\mathcal{R}(w)$, where $w=\{w_1, w_2, \ldots, w_L\}^T$ is the parameter vector of the learning model, L is the size of w, $\mathcal{F}(w)$ is the loss function, and $\mathcal{R}(w)$ is the regularized function.

2) CNN models: CNN models cannot be directly implemented using PARTEL, as the nested layers therein make the gradient elements of different layers dependent. The method of auxiliary variables may be used to decompose the CNN models into many independent sub-problems (refer to Document 6).

Figure 2:
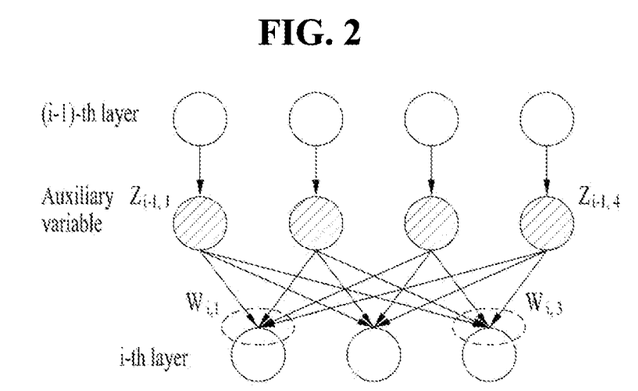
FIG. 2 illustrates an example of relation between the model parameter matrix W in a convolution neural network (CNN) model and an auxiliary matrix Z in the CNN model.

FIG. 2 illustrates an example of relation between the model parameter matrix W in a CNN model and an auxiliary matrix Z in the CNN model.

First, consider a CNN model with G hidden layers. The model parameter matrix is denoted as W with the size of L parameters. For an arbitrary layer therein, say layer g, the parameter matrix is denoted as $W_g$, the number of neurons is denoted as $I_g$, and the i-th neuron parametric vector is denoted as $w_{g,i}$. Thereby, the objective function is given by:

$\mathcal{L}(W)=\Sigma_{m=1}^M |y_m - \mathcal{F}(x_m;W)|^2$, with $\mathcal{F}(x;W)= f_{G+1}(\ldots f_2(f_1(x;W_1);W_2), \ldots;W_{G+1})$, where the model parameter matrix can be expressed as $W=[W_1, W_2, \ldots, W_G, W_{G+1}]$, the parameter matrix of the g-th layer can be expressed as $W_g=[w_{g,1}, w_{g,2}, \ldots, w_{g,I_g}]$, and $f_g(x; W_g)$ is the set of output (activation) functions of the g-th layer.

Then, the method of auxiliary variables is used by introducing one auxiliary variable per neuron per data sample: $z_{g,i,m}=f(w_{g,i}; z_{g-1,m})$, $\forall(g, i, m)$, where $f(\cdot)$ is the activation function, $w_{g,i}$ is the i-th neuron parametric vector in layer g, $z_{g,i,m}$ is the auxiliary variable introduced for the i-th neuron in layer g regarding data sample m, $z_{g-1,m}=[z_{g-1,1,m}, z_{g-1,2,m}, \ldots, z_{g,I_{g-1},m}]^T$ is the auxiliary variable vector for the layer (g−1) regarding data sample m, and $I_{g-1}$ is the number of neurons in the (g−1)-th layer. For an arbitrary data sample, say the m-th, the corresponding auxiliary matrix for the whole model is denoted as $Z_m = [z_{1,m}, \ldots, z_{g,m}, \ldots, z_{G,m}]$, called per-sample auxiliary matrix. Then the overall auxiliary matrix for all samples are denoted as $Z=[Z_1, \ldots, Z_m, \ldots, Z_M]$. The auxiliary variables are used to partition a CNN model to make workers (e.g. UEs) train the respective partitions of the CNN model, and are not used in inference using the trained CNN model.

Next, following Document 6, by using the quadratic-penalty method, the equality-constrained optimization problem (refer to Problem (2) in Document 6) is equivalent to minimizing:

$$\mathcal{L}_Q(W; Z; \mu) = \sum_{m=1}^{M} |y_m - f_{G+1}(z_{G,m}; W_{G+1})|^2 + \mu \sum_{g=1}^{G} \sum_{m=1}^{M} |z_{g,m} - f_g(z_{g-1,m}; W_g)|^2, \quad \text{Eq. (1)}$$

where $z_{0,m}=z_m$ and $\mu \to +\infty$.

Finally, the problem in Eq. (1) can be solved using the alternating optimization over W and Z, i.e., sequentially solving the W-stage and Z-stage, defined below, in each training iteration.

$$\min_W \mathcal{L}_Q(W; Z; \mu)$$

W-stage: Fixing the values of Z, solve the problem of in which the problem of each neuron is independent and can be written as:

$$\min_{w_{g,i}} \sum_{m=1}^{M} |z_{g,i,m} - f(w_{g,i}; z_{g-1,m})|^2, \quad \forall (g, i). \quad \text{Eq. (2)}$$

Note that one device is allocated a task of updating one or more neuron parametric vectors by solving the sub-problems in Eq. (2).

Z-stage: Conditioned on the values of W, solve the problem of $$\min_Z \mathcal{L}_Q(W; Z; \mu),$$

where the problem of optimizing each per-sample auxiliary matrix is independent of others and is given as $$\min_{Z_m} |y_m - f_{G+1}(W_{G+1}; z_{G,m})|^2 + \mu \sum_{g=1}^{G} |z_{g,m} - f_g(W_g; z_{g-1,m})|^2, \quad \forall m. \quad \text{Eq. (3)}$$

Note that one device is allocated a task of updating one or more neuron parametric vectors by solving the sub-problems in Eq. (3).

PARTEL Architecture

Figure 3:
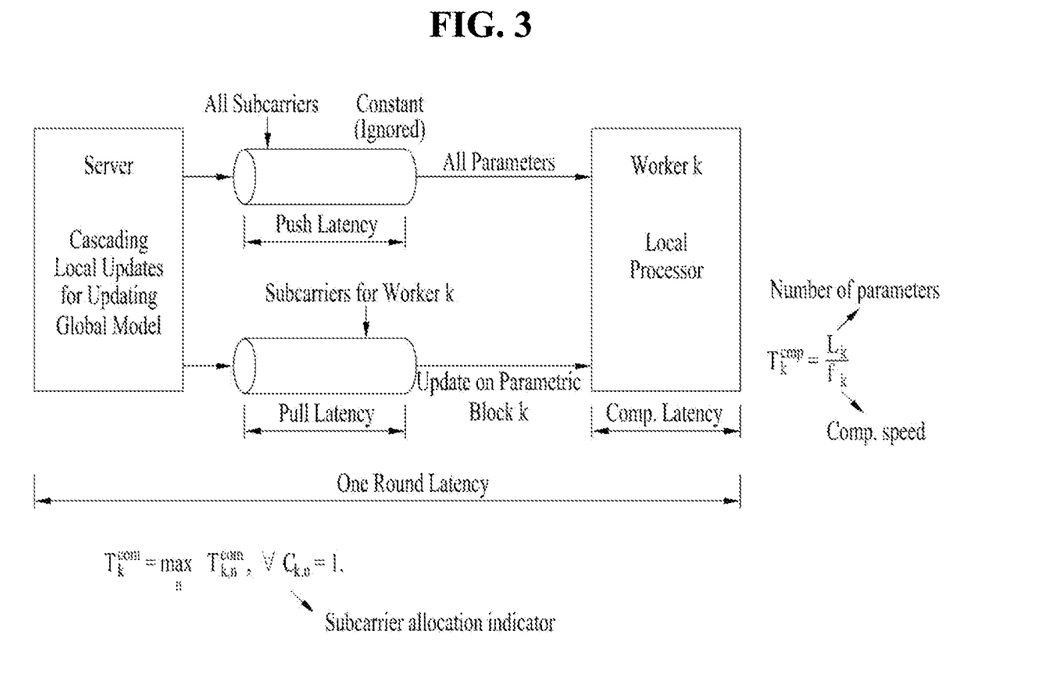
FIG. 3 illustrates an example of a latency model in the PARTEL system.

FIG. 3 illustrates an example of a latency model in the PARTEL system.

Considering the PARTEL system shown in FIG. 1, its operations shown in FIG. 3 may be elaborated as follows.

1) Decomposable Models: The model-parameter vector is partitioned into K disjoint parametric blocks, as w={w$_1$, ..., w$_k$, ..., w$_K$} where w$_k$ is allocated to worker k for update, using a downloaded dataset. In the PARTEL framework, one training iteration of the decomposable models is called one (communication) round. As shown in FIG. 2, there are three phases in each round, as follows.

Push Phase: The server broadcasts the whole model-parameter vector, w, to all workers.

Computation Phase: Each worker computes the update (e.g., gradients or the proximal gradients) of the its allocated parametric block.

Pull Phase: All workers upload the updates of their corresponding parametric blocks to the server. The server updates the whole parameter vector.

The training process in FIG. 2 iterates when all parametric blocks are updated in the round, i.e., the tasks of all workers are synchronized in each round.

2) CNN Models: As mentioned before, each round of CNN models comprises two stages: W-stage and Z-stage, described as follows.

W-stage: The parameter matrix W is divided into K blocks, with each being updated by one worker. To avoid inter-communication among different workers, the following load-granularity constraint is applied. Granularity Constraint 1 (Neuron Allocation for W-stage): in W-stage, each neuron parametric vector (e.g., w$_{g,i}$) defined in Eq. (2) should be allocated to one and only one worker.

Z-stage: The auxiliary matrix Z is divided into K blocks, with each being updated by one worker. To avoid inter-communication among workers, another load-granularity constraint is applied. Granularity Constraint 2 (Per-Sample Auxiliary Matrix Allocation for Z-stage): in Z-stage, each per-sample auxiliary matrix (e.g., Z$_m$) defined in Eq. (3) should be allocated to one and only one worker.

Figure 4:
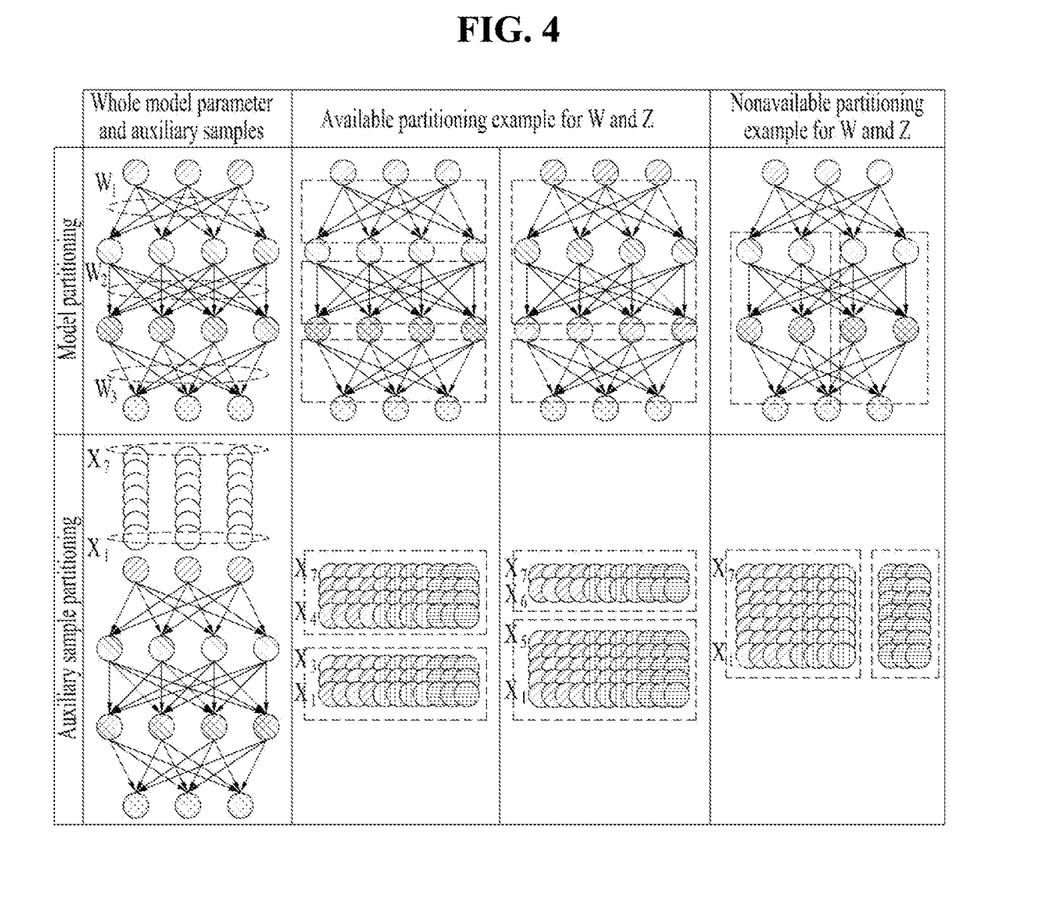
FIG. 4 shows examples of partitioning a model parameter matrix W and examples of partitioning an auxiliary matrix Z in some implementations of the present disclosure.

FIG. 4 shows examples of partitioning a model parameter matrix W and examples of partitioning an auxiliary matrix Z in some implementations of the present disclosure.

In the leftmost and uppermost cell among eight cells formed by two rows and four columns in FIG. 4, the layer including the upper most nodes is corresponding to the 0-th layer acting as an input layer, and edge information between (i−1)-th layer and the i-th layer is defined as a weight matrix or model parameter matrix W$_i$ for the i-th layer, where i=1, 2, 3. As shown in the second and third cells on the first row, W$_1$, W$_2$, and W$_3$ may be allocated to different workers but W$_i$ for the same i-th layer is allocated to only one worker. According to the granularity constraint 1, partitioning W$_i$ to different workers as shown in the last cell on the first row is not allowed.

Referring to the cells shown in the lowermost row, auxiliary variables output from a same data sample are allocated to one and only one worker according to the granularity constraint 2.

Each stage (W-stage or Z-stage) comprises three phases, push, computation, and pull, which are similar to those in the case of decomposable models. The main difference lies in the additional granularity constraint 1 or 2. Each round comprises two stages and the rounds are repeated until the CNN model converges.

Latency and Energy Consumption Model

Consider an arbitrary communication round and an arbitrary worker, say worker k. Referring to FIG. 3, the latency and energy consumption models of each phase mentioned above are described as below.

1) Push Phase: The push latency is the time for the server to broadcast the whole model-parameter vector to all workers. It is a constant identical for all workers. Besides, as the transmit power and bandwidth are very large during broadcasting, the push latency can be ignored. In this phase, the energy consumption by all workers is to receive the model-parameter vector from the server and is included in the circuit energy consumption that occurs in the workers and/or the server (even when the workers and the server do not perform computation or transmission) because the workers and the server are on. The circuit energy consumption may be constant. In the present disclosure, the circuit energy consumption is denoted as ξ.

2) Computation Phase: The computation latency of worker k depends on the size of the allocated parametric block L$_k$ and its computation speed f$_k$:

$$T_l^{cmp} = \frac{L_k}{f_k}, 1 \le k \le K. \quad \text{Eq. (4)}$$

According to Document 9, the computation power of worker k is P$_k^{cmp}$=g$_k$f$_k^3$, where g$_k$ is the computation power factor. Then, the computation energy of worker k is:

$$E_k^{cmp} = P_k^{cmp} \times T_k^{cmp} = g_k f_k^2 L_k, 1 \le k \le K. \quad \text{Eq. (4-1)}$$

3) Pull Phase: The pull phase consists of two parts. One is uploading gradient blocks from workers to the server. The other is the server updating the global model using the gradients sent by the workers. For the latter part, there is no energy consumption at the workers. Its latency is a constant and is same for all workers. In the following description, the model update latency is ignored, as it is small and has no impact on the solution of latency minimization.

For uploading, worker k transmits over a set of assigned subcarriers. Let T$_{k,n}^{com}$ denote the uploading latency of worker k on subcarrier n. If subcarrier n is not allocated to k, i.e., C$_{k,n}$=0, T$^{com}$=0. Otherwise, $$T_{k,n}^{com} = \frac{L_{k,n}\tau}{R_{k,n}}, \forall C_{k,n} = 1, \quad \text{Eq. (5)}$$

where L$_{k,n}$ is the number of parameters uploaded by worker k on subcarrier n, τ is the number of bits per gradient element, B is the bandwidth of the subcarrier, and R$_{k,n}$ is the channel capacity of worker k on subcarrier n. The channel capacity is given by:

$$R_{k,n} = B \log_2\left(1 + \frac{P_{k,n}^{com} h_{k,n}}{\sigma^2}\right), \forall (k, n),$$

where σ$^2$ is the power of additive white Gaussian noise, P$_{k,n}^{com}$ is the transmit power, and h$_{k,n}$ is the channel gain of worker k on subcarrier n, respectively. It follows that:

$$P_{k,n}^{com} = \frac{\left(2^{R_{k,n}/B} - 1\right)\sigma^2}{h_{k,n}}, \forall (k, n). \quad \text{Eq. (6)}$$

Then, the overall uploading latency of worker k is decided by the slowest subcarrier:

$$T_k^{com} = \max_n T_{k,n}^{com}, 1 \le k \le K. \quad \text{Eq. (7)}$$

The uploading energy consumption of worker k is modeled as follows. Let $E_{k,n}^{com}$ denote the transmit energy consumption of worker k on subcarrier n. If subcarrier n is not allocated, i.e., $C_{k,n}=0$, $E_{k,n}^{com}=0$. Otherwise, $$E_{k,n}^{com} = C_{k,n} P_{k,n}^{com} T_{k,n}^{com}, \forall (k,n).$$

By using Eq. (6) and Eq. (7), $E_{k,n}^{com}$ can be further derived as:

$$E_{k,n}^{com} = \frac{C_{k,n}\left(2^{R_{k,n}/B} - 1\right)\sigma^2 L_{k,n}\tau}{h_{k,n} R_{k,n}}, \forall (k, n). \quad \text{Eq. (8)}$$

The total uploading energy consumption of worker k is the sum of uploading energy consumption over all subcarriers: $\{E_k^{com} = \Sigma_{n=1}^N E_{k,n}^{com}, 1 \le k \le K\}$. Eq. (8) can be substituted by Eq. (9), $$E_k^{com} = \sum_{n=1}^N \frac{C_{k,n}\left(2^{R_{k,n}/B} - 1\right)\sigma^2 L_{k,n}\tau}{h_{k,n} R_{k,n}}, 1 \le k \le K. \quad (9)$$

Next, the total latency and energy consumption of worker k are defined as follows. The latency of worker k is the sum latencies of the two phases:

$$T_k = T_k^{cmp} + T_k^{com}, 1 \le k \le K. \quad \text{Eq. (10)}$$

The energy consumption of worker k is given by:

$$E_k = E_k^{cmp} + E_k^{com} + \xi, 1 \le k \le K. \quad \text{Eq. (11)}$$

In some implementations of the present disclosure, the overall learning latency of the PARTEL system is minimized. The overall learning latency of the PARTEL system depends on two factors: the per-round latency and the number of rounds for model convergence. It is shown in Document 2 that the overall learning latency minimization is equivalent to separately minimizing the per-round latency. Hereinafter, minimizing the per-round latency is described.

For an arbitrary round, minimizing its latency, denoted as T, under the constraints on subcarrier assignment, latency requirement, parameter allocation, and power control, is described as follows.

1) Subcarrier Assignment Constraints: Each subcarrier can be allocated to one worker:

$$C_{k,n} \in \{0,1\}, \forall (k,n), \quad (C1)$$

$$\Sigma_{k=1}^K C_{k,n} = 1, 1 \le n \le N. \quad (C2)$$

2) Per-Round Latency Constraints: As all parametric blocks should be updated in one round, all workers' latencies, say $\{T_k\}$, should not exceed the overall one-round latency T:

$$T_k \le T, 1 \le k \le K,$$

which, by using Eq. (10), can be derived as:

$$T_k^{cmp} + T_{k,n}^{com} \le T, \forall C_{k,n} = 1. \quad (C3)$$

3) Parameter Constraints: The parameter constraints are two tiers. On the one hand, the total updatable number of parameters by all workers should be no smaller than the size of the model:

$$\Sigma_{k=1}^K L_k \ge L. \quad (C4)$$

On the other hand, for each worker, the total uploaded number of parameters on all subcarriers should be no smaller than its allocated parametric-block size:

$$\Sigma_{n=1}^N C_{k,n} L_{k,n} \ge L_k, 1 \le k \le K. \quad (C5)$$

In the following description, $\{L_k\}$ and $\{L_{k,n}\}$ are relaxed to be continuous for simplicity. In practice, the solved $\{L^*_k\}$ and $\{L^*_{k,n}\}$ will be rounded for implementation and the loss caused by the rounding operation can be ignored, since the values of $\{L_k\}$ and $\{L_{k,n}\}$ are typically large.

For the case of CNN models, granularity constraints 1 and 2 can be written mathematically as follows.

$$(C_{cnn}) \frac{L_k}{L_{sub}} \in N^+, 1 \le k \le K,$$

where $N^+$ is the set of positive integers and $L_{sub}$ is the size of the sub-problems, i.e., neurons or per-sample auxiliary matrices.

4) Power Constraints: The power consumption of each worker is constrained as:

$$\frac{E_k}{T} \le P_k, 1 \le k \le K. \quad (C6)$$

5) Latency-Minimization Problem: Under these constraints, the per-round latency-minimization problem by joint SUPPORT can be formulated as:

$$\min_{\{C_{k,n}\},\{L_k\},\{L_{k,n}\},\{R_{k,n}\},T} T, \quad (P1)$$

$$\text{s.t } (C1) \sim (C6), \& (C_{cnn}) \text{ for a CNN model.}$$

Hereinafter, in order to solve the per-round latency minimization problem (P1), described are how to partition the model per user (i.e., worker), how to allocate subcarriers per user, and how to allocate power to subcarriers allocated to each user. In particular, methods for minimizing per-round latency are described in connection with i) decomposable models and ii) CNN models, using the afore-mentioned constraints C1 to C6.

Methods for Decomposable Models

1) By utilizing the KarushKuhnTucker (KKT) conditions, a necessary condition for the equivalent latency requirement is derived to simplify Problem (P1), as:

$$T_k^{cmp} + T_{k,n}^{com} = T, \forall C_{k,n} = 1, \quad \text{Eq. (12)}$$

where $T_k^{cmp}$ is the computation latency of worker k and $T_{k,n}^{com}$ is the computation latency of worker k on subcarrier n. From Eq. (12), all workers should have the same latency with the overall latency T. Besides, for each worker, the uploading latency on all allocated subcarriers should be equal.

By substituting the computation latency $T_k^{cmp}$ defined in Eq. (4) and the uploading latency $T_{k,n}^{com}$ defined in Eq. (5) into Eq. (12), the number of parameters uploaded by worker k on subcarrier n, say $L_{k,n}$, is derived as:

$$L_{k,n} = \frac{C_{k,n} R_{k,n}}{\tau}\left(T - \frac{L_k}{f_k}\right), \forall (k, n),$$ Eq. (13)

where $L_k$ is the size of parametric block assigned to worker k.

2) By substituting Eq. (13) into Problem (P1), it can be equivalently derived as:

$$\min_{\{C_{k,n}\},\{L_k\},\{R_{k,n}\},T} T,$$ (P2)

s.t (C1), (C2), (C4), $$\sum_{n=1}^{N} \frac{C_{k,n} R_{k,n}}{\tau}\left(T - \frac{L_k}{f_k}\right) \geq L_k, 1 \leq k \leq K,$$

$$E_k \leq P_k T, 1 \leq k \leq K,$$

where $E_k$, defined in Eq. (11), is the energy consumption of worker k. By using Eq. (4-1), Eq. (9), Eq. (11) and Eq. (13), $E_k$ can be derived as:

$$E_k = g_k f_k^2 L_k + \sum_{n=1}^{N} \frac{C_{k,n}\left(2^{R_{k,n}/B} - 1\right)\sigma^2}{h_{k,n}}\left(T - \frac{L_k}{f_k}\right) + \xi.$$ Eq. (14)

3) Problem (P2) is a mixed integer non-convex problem and is NP-hard. Two steps are used to tackle it. First, following the standard approach to tackle integer programming, linear programming relaxation is used to relax the subcarrier-allocation indicators in Problem (P2) to be continuous, i.e., $\{C_{k,n} \in [0,1], \forall (k, n)\}$. Then, the relaxed problem can be equivalently converted to the problem of updatable model size maximization.

Given the one-round latency T for an arbitrary round, let $\hat{L}^*(T)$ denote the maximum size of a model that can be updated within the round. Then $\hat{L}^*(T)$ solves the following problem of model size maximization:

$$\hat{L}^*(T) = \max_{\{C_{k,n}\},\{L_k\},\{R_{k,n}\}} \sum_{k=1}^{K} L_k,$$ (P3)

s.t. $0 \leq C_{k,n} \leq 1, \forall (k, n),$ $$\sum_{k=1}^{K} C_{k,n} = 1, 1 \leq n \leq N,$$

$$\sum_{n=1}^{N} \frac{C_{k,n} R_{k,n}}{\tau}\left(T - \frac{L_k}{f_k}\right) \geq L_k, 1 \leq k \leq K,$$

$$E_k \leq P_k T, 1 \leq k \leq K,$$

where $E_k$ is the energy consumption of worker k defined in Eq. (14).

4) It can be shown that $\hat{L}^*(T)$ is a monotonously increasing function of T.

5) It follows from 4) that the solution of Problem (P2) is the minimal latency, say $T^*$, which makes the updatable model size $\hat{L}^*(T^*)$ no less than the target size L. This suggests a method to solve Problem (P2) by searching $T^*$ using the criterion $\hat{L}^*(T) \geq L$, which will be elaborated in the later.

6) To get the maximum updatable model size $\hat{L}^*(T)$ requires solving Problem (P3). To this end, the following variables are used to transform Problem (P3) into a convex problem.

$$\begin{cases} \phi_k = \left(T - \frac{L_k}{f_k}\right)^{-1}, \\ \tilde{R}_{k,n} = C_{k,n} R_{k,n} \end{cases}$$ Eq. (15)

7) By using the variables in Eq. (15) and $E_k$ defined in Eq. (14), Problem (P3) can be written as:

$$\hat{L}^*(T) = \max_{\{C_{k,n}\},\{\phi_k\},\{\tilde{R}_{k,n}\}} \sum_{k=1}^{K} f_k\left(T - \frac{1}{\phi_k}\right),$$ (P4)

s.t. $0 \leq C_{k,n} \leq 1, \forall (k, n),$ $$\sum_{k=1}^{K} C_{k,n} = 1, 1 \leq n \leq N,$$

$$\sum_{n=1}^{N} \frac{\tilde{R}_{k,n}}{\tau} \geq f_k(T\phi_k - 1), 1 \leq k \leq K,$$

$$\sum_{n=1}^{N} \frac{C_{k,n}\sigma^2\left(2^{\frac{\tilde{R}_{k,n}}{BC_{k,n}}} - 1\right)}{h_{k,n}} + g_k f_k^3(\phi_k T - 1) \leq (P_k T - \xi)\phi_k,$$

$1 \leq k \leq K.$

8) It can be shown that Problem (P4) is a convex problem.
9) It follows from 8) that the primal-dual method can be used to get the optimal solution of Problem (P4) as follows:

$$\max_{\{\mu_n\},\{\lambda_k\},\{\nu_k\}} \min_{\{C_{k,n}\},\{\tilde{R}_{k,n}\},\{\phi_k\}} L_{P4},$$

where $L_{P4}$ is the Lagrange function of Problem (P4), given as:

$$L_{P4} =$$

$$-\sum_{k=1}^{K} f_k\left(T - \frac{1}{\phi_k}\right) + \sum_{n=1}^{N}\mu_n\left(1 - \sum_{k=1}^{K} C_{k,n}\right) + \sum_{k=1}^{K}\lambda_k\left[f_k(T\phi_k - 1) - \sum_{n=1}^{N}\frac{\tilde{R}_{k,n}}{\tau}\right] +$$

$$\sum_{k=1}^{K}\nu_k\left[\sum_n C_{k,n}\left(2^{\frac{\tilde{R}_{k,n}}{BC_{k,n}}} - 1\right) \times \frac{\sigma^2}{h_{k,n}} + g_k f_k^3(T\phi_k - 1) - (P_k T - \xi)\phi_k\right],$$

where $\{\mu_n\}$, $\{\lambda_k \geq 0\}$, and $\{\nu_k \geq 0\}$ are Lagrangian multipliers. The Lagrangian multipliers are auxiliary variables that can be obtained based on the optimization theory well known to the person skilled in the art. For example, initial values of $\mu_n$, $\lambda L_k$, and $\nu_k$ may be arbitrary values, and $\{\mu_n\}$, $\{\lambda_k \geq 0\}$, and $\{\nu_k \geq 0\}$ are obtained by searching for $\{\mu_n\}$, $\{\lambda_k\}$, and $\{\nu_k\}$ which maximize a value of the inner loop problem $$\max_{\{\mu_n\},\{\lambda_k\},\{\nu_k\}} \min_{\{C_{k,n}\},\{\tilde{R}_{k,n}\},\{\phi_k\}} L_{P4}.$$

10) The necessary conditions (e.g., KKT) for achieving the optimal solution of the inner loop are used to derive the following optimal policies.

11) The optimal channel-capacity allocation scheme is:

$$R_{k,n}^* = \begin{cases} \dfrac{\tilde{R}_{k,n}^*}{C_{k,n}^*} = B\log_2\left(\dfrac{\lambda_k B}{v_k \tau \ln 2}\right) + B\log_2\left(\dfrac{h_{k,n}}{\sigma^2}\right), & \forall\, C_{k,n} \neq 0, \\ 0, & \text{otherwise} \end{cases}$$

12) The optimal power-allocation scheme is:

$$P_{k,n}^{com*} = \begin{cases} \dfrac{\lambda_k B}{v_k \tau \ln 2} - \dfrac{\sigma^2}{h_{k,n}}, & \forall\, C_{k,n} \neq 0, \\ 0, & \text{otherwise} \end{cases} \quad \text{Eq. (17)}$$

13) The optimal inter-worker parameter-allocation scheme is:

$$L^*_k = [T - \sqrt{\lambda_k T + v_k g_k f_k^2 T - v_k(P_k T - \xi) f_k}]f_k,\ 1 \le k \le K. \quad \text{Eq. (18)}$$

14) The optimal intra-worker parameter allocation scheme is given by:

$$L_{k,n}^* = \begin{cases} \dfrac{\sqrt{\lambda_k T + v_k g_k f_k^2 T - v_k(P_k T - \xi)/f_k}}{\tau} \times B\log_2\left(\dfrac{\lambda_k B}{v_k \tau \ln 2} \times \dfrac{h_{k,n}}{\sigma^2}\right) & \text{if } C_{k,n} \neq 0, \\ 0, & \text{otherwise} \end{cases}$$

which shows that more parameters should be assigned to the channel with high gain.

15) The optimal subcarrier allocation is given as follows:

$$C_{k,n}^* \begin{cases} = 0, & \text{if } I_{k,n} > \mu_n, \\ \in (0, 1), & \text{if } I_{k,n} = \mu_n \text{ for multiple workers}, \\ = 1, & \text{if } I_{k,n} = \mu_n \text{ for a unique worker}, \end{cases}$$

where $\mu_n = \min_k I_{k,n}$ and $I_{k,n}$ is the indicator function defined as follows:

$$I_{k,n} = \dfrac{v_k \sigma^2}{h_{k,n}}\left[\left(2^{R_{k,n}^*/B} - 1\right) - \dfrac{R_{k,n}^* 2^{R_{k,n}^*/B} \ln 2}{B}\right],$$

$\forall\, (k, n)$, where $R^*_{k,n}$ is the optimal channel capacity of worker k on subcarrier n defined in Eq. (16).

16) Note that in the optimal scheme in Eq. (19), some subcarrier-allocation indicators may be fractions. A scheme will be described in the later to round them to binary.

17) Based on the closed-form results in 11), 12), 13), 14) and 15), a low complexity optimal algorithm is proposed to solve the convex Problem (P4) and hence, Problem (P3) is equivalently solved. The algorithm is described as follows.

TABLE 2

Algorithm 1 Updatable Model Size Maximization

1:  Input: the channel gains $\{h_{k,n}\}$ and the given one-round latency T.
2:  Initialize $\{\lambda^{(0)}\}, \{\mu^{(0)}\}$, and $i = 0$.

TABLE 2-continued

Algorithm 1 Updatable Model Size Maximization

3:  Loop
4:    Update the multipliers as $$\begin{cases} \lambda_k^{(i+1)} = \max\left\{\lambda_k^{(i)} + \eta_{\lambda_k} \dfrac{\partial \mathcal{L}_{P4}}{\partial \lambda_k}, 0\right\}, 1 \le k \le K, \\ v_k^{(i+1)} = \max\left\{v_k^{(i)} + \eta_{v_k} \dfrac{\partial \mathcal{L}_{P4}}{\partial v_k}, 0\right\}, 1 \le k \le K, \end{cases}$$

5:    Solve $\{R_{k,n}^*\}, \{L_k^*\}$ and $\{C_{k,n}^*\}$ using Eq. (16), Eq. (18), and Eq. (19), respectively.
6:    Get $\{\phi_k^*\}$ and $\{R_{k,n}^*\}$ with Eq. (15).
7:  Until Convergence
8:  $\hat{L}^*(T) = \Sigma_{k=1}^K L_k^*$.
9:  Output: $\hat{L}^*(T), \{R_{k,n}^*\}, \{L_k^*\}$ and $\{C_{k,n}^*\}$.

In the algorithm above, $\mathcal{L}_{P4}$ and $\{\mu_n\}, \{\lambda_k \ge 0\}, \{v_k \ge 0\}$ are Lagrange function and multipliers of Problem (P4) and is defined in 9). $\{\eta_{\lambda_k}\}$ and $\{\eta_{v_k}\}$ denote the step sizes of gradient descent.

18) The computation complexity of the algorithm in 17) is $O(K^2 N)$ with K being the number of workers and N being the number of subcarriers.

19) Then, as mentioned in 4) and 5), Problem (P2) with relaxed subcarrier-allocation indicators can be solved by nesting a one-dimensional search over the latency T and solving the convex Problem (P4). Based on the monotonicity of $\hat{L}^*(T)$ in 4), the search can be efficiently implemented by bisection method. While the solution of Problem (P4) is presented in 17). Then the optimal policy to solve Problem (P2) with relaxed subcarrier-allocation indicators is presented in the following, by nesting the bisection search and the algorithm in 17).

TABLE 2

Algorithm 2 Joint Support

1:  Input: the channel gains $\{h_{k,n}\}$ and the given one-round latency T.
2:  Select $T = T_u$ that makes $\hat{L}^*(T_u)$ defined in Problem (P4) larger than L.
3:  Select $T = T_l$ that makes $\hat{L}^*(T_l) < L$.
4:  While $T_u \ne T_l$
5:    Let $T_m = (T_u + T_l)/2$.
6:    Input $\{h_{k,n}\}$ and $T = T_m$ into the Algorithm 1 to solve Problem (P4).
7:    Obtain $\hat{L}^*(T_m), \{L_k^*\}, \{R_{k,n}^*\}$, and $\{C_{k,n}^*\}$.
8:    If $\hat{L}^*(T_m) \ge L$
9:      $T_u = T_m$.
10:   Else
11:     $T_l = T_m$.
12:   End If
13: End While
14: $T^* = T_m$.
15: Output: $T^*, \{R_{k,n}^*\}, \{L_k^*\}$ and $\{C_{k,n}^*\}$.

20) Finally, based on the algorithm in 19), the joint scheme of SUPPORT without relaxation is proposed to solve the original Problem (P1). Note that not all subcarrier-allocation indicators solved by the algorithm in 19) are integers, i.e., $C_{k,n} \in (0,1)$ for some (k, n). For these subcarriers, a practical subcarrier-allocation scheme is determined as follows:

$$C^*_{k_1,n} = 1,$$ 
$$k_1 = \arg\max_k L^*_{k,n},$$ 
$$1 \le n \le N,$$ 
Eq. (20)

where the subcarrier is allocated to the worker with the largest value. Then, given the subcarrier-allocation scheme $\{C_{k,n}\}$, the latency-minimization problem is a special case of Problem (P1), whose solution can also be solved by the algorithm in 19).

Figure 5:
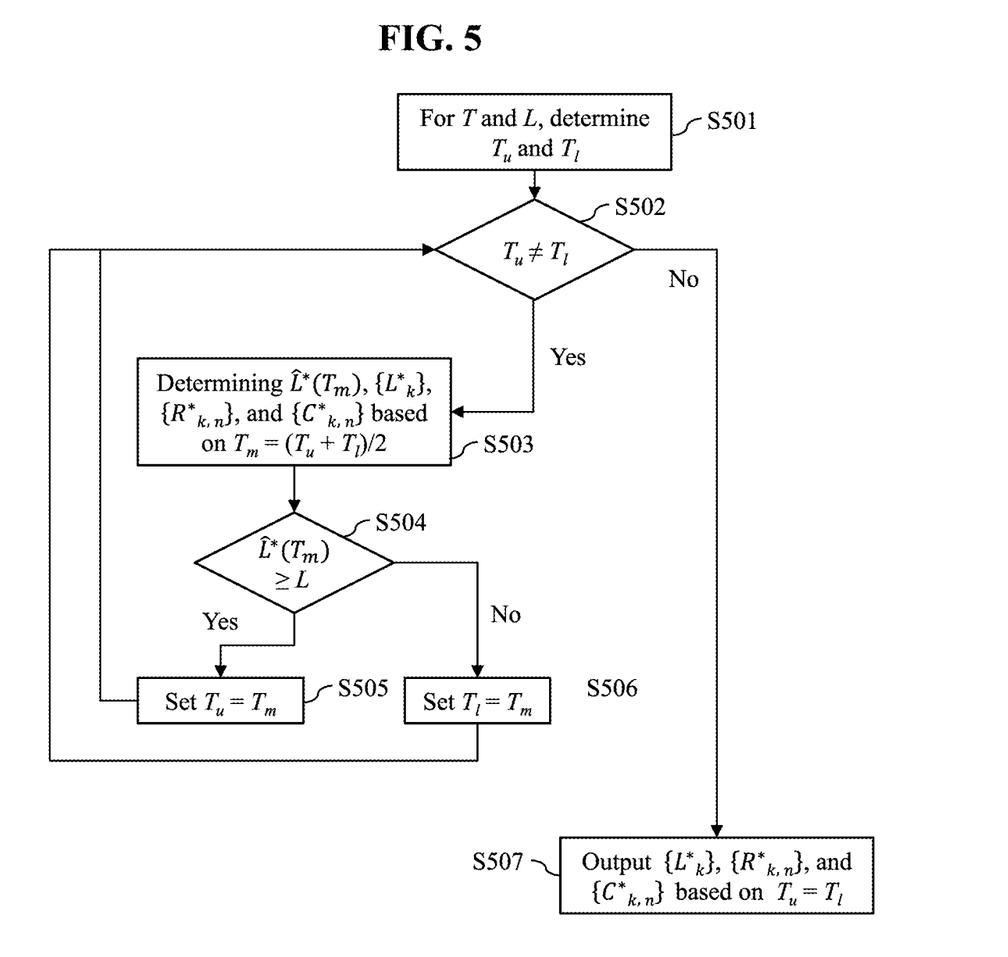
FIG. 5 illustrates an example of a flow diagram for determining model parameters, subcarriers and channel capacity for workers (e.g. UEs) according to some implementations of the present disclosure.

FIG. 5 illustrates an example of a flow diagram for determining model parameters, subcarriers and channel capacity for workers (e.g. UEs) according to some implementations of the present disclosure.

According to Algorithm 1 shown in Table 2 and Algorithm 2 shown in Table 3, a serve (and/or base station) may determine T*, $\{R^*_{k,n}\}$, $\{L^*_k\}$ and $\{C^*_{k,n}\}$ for workers k=1, . . . ,K which are participating in the partitioned edge learning of the model W.

For example, referring to FIG. 5, a base station (BS) may determining, for an one-round latency T and an overall model size L, i) $T_u$ that makes $\hat{L}^*(T_u)$ larger than L and ii) $T_l$ that makes $\hat{L}^*(T_l) < L$ (S501). If $T_u \ne T_l$ (S502, Yes), the BS determines $\hat{L}^*(T_m)$, $\{L^*_k\}$, $\{R^*_{k,n}\}$, and $\{C^*_{k,n}\}$ based on $T_m = (T_u + T_l)/2$ (S503). If $\hat{L}^*(T_m) \ge L$ (S504, Yes), the BS sets $T_u = T_m$ (S505). If $\hat{L}^*(T_m) < L$ (S504, No), the BS sets $T_l = T_m$ (S506). While $T_u \ne T_l$, the BS repeats S502 to 506. If $T_u = T_l$ (S502, No), the BS determines $T^* = T_m$ and outputs $\{L^*_k\}$, $\{R^*_{k,n}\}$, and $\{C^*_{k,n}\}$ determined based on $T^* = T_m$ (i.e, based on $T_u$ or $T_l$) (S507).

In other words, based on Algorithm 1 and Algorithm 2, for each worker participating in the partitioned edge learning, the BS may determine the partial model parameter $w_k$ to be updated by worker k, subcarriers through which worker k reports updated partial model parameter $w_k$, and channel capacity (e.g. power) for each subcarrier n allocated to worker k. The BS may receive the updated partial model parameter $w_k$ from each worker k, and update the overall model parameter matrix W of the NN model.

Methods for CNN Models

1) A practical scheme, which leverages the result for decomposable models, is proposed to solve Problem (P1) for CNN models, described as follows.

Step 1: For both W-stage and Z-stage, solve the joint scheme of SUPPORT using the above methods in Decomposable Models without considering granularity constraints 1 and 2.

Step 2: Given the subcarrier-allocation scheme, round the parameter allocation for each worker to satisfy granularity constraint 1 for W-stage and granularity constraint 2 for Z-stage.

2) For the scheme in 1), the challenges lie in Step 2 and are two-fold. On one hand, how should the rounding indicator be designed to minimize the rounding loss. On the other hand, as each worker's number of parameters changes, the corresponding channel-capacity (or power) allocation and intra-worker parameter allocation among the assigned subcarriers should be redesigned.

3) Denote the solved one-round latency as T*, the subcarrier-allocation policy as $\{C^*_{k,n}\}$, the spectrum efficiencies as $\{R^*_{k,n}\}$, the number of parameters of worker k as $L^*_k$, the number of parameters uploaded by worker k on subcarrier n as $L^*_{k,n}$.

4) Consider an arbitrary worker, say worker k. If its number of parameters is rounded down to satisfy ($C_{cnn}$), the reduced number of parameters is denoted as $\Delta L_k^d \ge 0$. If its number of parameters is rounded up, the additional number of parameters to be uploaded is denoted as $\Delta L_k^u \ge 0$. Note that if worker k's number of parameters is rounded down, no influence is caused to the one-round latency. Hence, only the case of being rounded up is considered in the following description. In some implementations described below, a rounding scheme to minimize the resulted additional one-round latency is described.

5) Next, the joint scheme of SUPPORT may be designed as follows:

$$\begin{cases} C_{k,n} = C^*_{k,n}, \\ R_{k,n} = R^*_{k,n}, \\ \Delta L_{k,n} = L^*_{k,n} \times \dfrac{\Delta L_k^u}{L^*_k}, \end{cases}$$
Eq. (22)

where $\Delta L_{k,n}$ is the number of additional parameters allocated to subcarrier n for uploading, which is proportional to its currently uploaded number of parameters $L^*_{k,n}$.

6) Consider an arbitrary worker, say worker k, the design in Eq. (22) results in an upper bound of the minimum additional latency:

$$\Delta T_k \le T^* \times \dfrac{\Delta L_k^u}{L^*_k},$$ 
Eq. (23)

where T* is the solved latency in Step 1, $\Delta T_k$, $\Delta L_k^u$, and $L^*_k$ are the additional latency, the number of additional parameters after the rounding operation, and the solved number of parameters in Step 1 of worker k, respectively.

7) The proof of Eq. (23) is straightforward and hence omitted in the present disclosure. Two observations can be made from Eq. (23). On one hand, the size of the sub-problems is far smaller than the problems of W-stage and Z-stage, i.e., $\Delta L_k^u \ll L^*_k$. Therefore, the additional latency $\Delta T_k$ is small for all workers. On the other hand, the round-up indicator, denoted as $I_k$ should be the following ratio:

$$I_k = \dfrac{\Delta L_k^u}{L^*_k}.$$

8) Following 7), the parameter rounding scheme is designed as in the following, which makes the workers with least $I_k$ to round up and the others to round down.

Step 1: Sort the round-up indicators $\{I_k\}$ from the least to the biggest and the new permutation is indexed by k', i.e., $\{I_{k'}\}$ is sorted from the least to the largest.

Step 2: Find the least $K'_1$ following the new permutation $\{I_{k'}\}$, which satisfies:

$$\Sigma_{k'=1}^{K'_1} \Delta L_{k'}^u \ge \Sigma_{k'=K_1+1}^{K} \Delta L_{k'}^d,$$ 
Eq. (23)

where $\Delta L_{k'}^u$ is the additional number of parameters of worker k' when being rounded up and $\Delta L_{k'}^d$ is the reduced number of parameters when being rounded down. Eq. (23)

means that by rounding up $K'_1$ workers with least round-up indicators, the parameters of all workers can satisfy granularity constraints 1 and 2.

Step 3: The additional one-round latency is $\Delta T \leq T^* \times I_{K'_1}$, where $T^*$ is the solved one round latency without considering granularity constraints 1 and 2.

For CNN models, when determining the partial model parameter $w_k$, the BS may determine the partial model parameter to be updated by worker k under the granularity constraint 1. In CNN models, the BS may update a CNN model by updating a model parameter matrix W (W-stage) and then updating auxiliary matrix Z (Z-stage). The BS determines the per-sample auxiliary matrix $z_m$ for each worker under the granularity constraint 2. For example, the BS may update the model parameter matrix W and auxiliary matrix Z as shown in FIG. 6.

Figure 6:
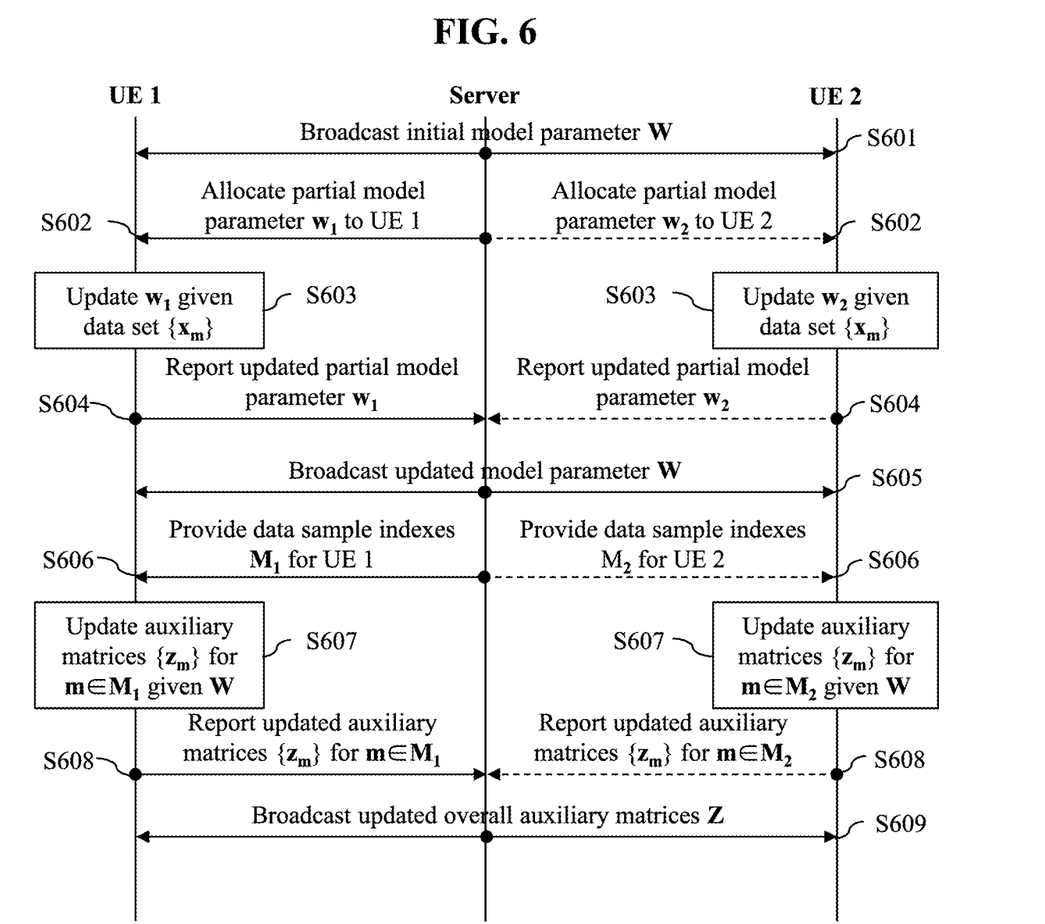
FIG. 6 illustrates an example of the update procedure of a neural network (NN) model according to some implementations of the present disclosure.

FIG. 6 illustrates an example of the update procedure of a neural network (NN) model according to some implementations of the present disclosure. For convenience description, in FIG. 6, it is assumed that two workers (UE 1 and UE 2) participate in the partitioned edge learning. The CNN model may be updated by partitioning the model parameters W and the auxiliary matrices Z to the workers for edge-learning (S601 to S609). S602 to S609 may be iterated periodically or upon request of the server for updating the CNN model.

According to some implementations of the present disclosure, the learning latency of PARTEL can be significantly reduced. Accordingly, some implementations of the present disclosure can improve the learning efficiency.

The invention claimed is:

1. A method for updating a neural network (NN) model at a base station in a neural network (NN) based wireless communication system, the method comprising:
determining a minimal latency $T^*$ that makes $\hat{L}^*(T^*)$ no less than an overall model size L of the NN model, where $\hat{L}^*(T^*)$ is an updatable model size for one-round latency $T^*$, wherein determining the minimal latency $T^*$ comprises:
selecting i) an upper one-round latency value $T_u$ that makes $\hat{L}^*(T_u)$ larger than L and ii) a lower one-round latency value $T_l$ that makes $\hat{L}^*(T_l)$<L,
determining $\hat{L}^*(T_m)$, $\{R^*_{k,n}\}$, $\{L^*_k\}$, and $\{C^*_{k,n}\}$ based on channel gains $\{h_{k,n}\}$ by setting $T_m=(T_u+T_l)/2$ based on $T_u$ being different from $T_l$, where k=1, ..., K, where K is the total number of user equipments to which parameters of the NN model are allocated, n=1, ..., N, where N is the total number of subcarriers, $R^*_{k,n}$ is channel capacity of user equipment k on subcarrier n, $L^*_k$ is parameter allocation to user equipment k, and $C^*_{k,n}$ is uplink subcarrier allocation indicator for user equipment k, and $h_{k,n}$ is an uplink channel gain of user equipment k on subcarrier n,
setting $T_u=T_m$ based on $\hat{L}^*(T_m)$ being equal to or larger than L and setting $T_l=T_m$ based on $\hat{L}^*(T_m)$ being smaller than L,
repeating determining $\hat{L}^*(T_m)$, $\{R^*_{k,n}\}$, $\{L^*_k\}$, and $\{C^*_{k,n}\}$, where $T_m=(T_u+T_l)/2$ based on $T_u$ being different from $T_l$, and
determining $T_m$ as $T^*$ and outputting $\{R^*_{k,n}\}$, $\{L^*_k\}$, and $\{C^*_{k,n}\}$ for $T^*$, based on $T_u$ being equal to $T_l$;
transmitting NN model parameters to user equipments 1 to K based on the output $\{R^*_{k,n}\}$, $\{L^*_k\}$, and $\{C^*_{k,n}\}$ for $T^*$;
receiving update results of the NN model parameters from user equipments 1 to K; and
updating the NN model based on the received update results.

2. The method according to claim 1, wherein determining $\hat{L}^*(T_m)$, $\{R^*_{k,n}\}$, $\{L^*_k\}$, and $\{C^*_{k,n}\}$ comprises:
Determining $C^*_{k,n}=0$ based on $I_{k,n}$ being larger than $\mu_n$;
determining $C^*_{k,n} \in (0,1)$ based on $I_{k,n}$ being equal to $\mu_n$ for multiple user equipments; and
determining $C^*_{k,n}=1$ based on $I_{k,n}$ being equal to $\mu_n$ for a single user equipment,
wherein $$\mu_n = \min_k I_{k,n},$$

and
wherein $$I_{k,n} = \frac{v_k \sigma^2}{h_{k,n}}\left[\left(2^{R^*_{k,n}/B} - 1\right) - \frac{R^*_{k,n} 2^{R^*_{k,n}/B} \ln 2}{B}\right],$$

where B is a system bandwidth of a cell, $\sigma^2$ is additive white Gaussian noise power, and $v_k$ is a Lagrange multiplier.

3. The method according to claim 2, wherein determining $\hat{L}^*(T_m)$, $\{R^*_{k,n}\}$, $\{L^*_k\}$, and $\{C^*_{k,n}\}$ comprises:
determining $\{R^*_{k,n}\}$ based on $$R^*_{k,n} = B\log_2\left(\frac{\lambda_k B}{v_k \tau \ln 2}\right) + B\log\left(\frac{h_{k,n}}{\sigma^2}\right) \quad \text{i)}$$

for all $C_{k,n} \neq 0$, and ii) $R^*_{k,n}=0$ for all $C_{k,n}=0$,
wherein is a Lagrange multiplier, and $\tau$ is the number of bits per NN model parameter.

4. The method according to claim 3, wherein determining $\hat{L}^*(T_m)$, $\{R^*_{k,n}\}$, $\{L^*_k\}$, $\hat{L}^*(T_m)$, $\{R^*_{k,n}\}$, $\{L^*_k\}$, and $\{C^*_{k,n}\}$ comprises:
determining $\{L^*_k\}$ based on $L^*_k = [T - \sqrt{\lambda_k T_m + v_k g_k f_k^2 T_m - v_k(P_k T_m - \xi)/f_k}]f_k$,
wherein $\xi$ is circuit energy consumption, $g_x$ computation power factor of user equipment k, $g_k$ is computation frequency of user equipment k, and $P_k$ is permitted energy consumption of user equipment k.

5. The method according to claim 1, wherein $\hat{L}^*(T_m)= \Sigma_{k=1}^{K} L^*_k$.

6. The method according to claim 1, wherein determining $\hat{L}^*(T_m)$, $\{R^*_{k,n}\}$, $\{L^*_k\}$, and $\{C^*_{k,n}\}$ comprises:
determining $\{L^*_k\}$ based on constraints comprising:
i) allocating $w_{g,i}$ to only one user equipment, where $w_{g,i}$ is the i-th neuron parametric vector in layer g of the NN model; and
ii) allocating $Z_m=\{z_{i,m}, \ldots, z_{g,m}, \ldots, z_{G,m}\}$ to only one user equipment, where $Z_m$ is an auxiliary matrix for data sample m, $z_{g-1,m}=[z_{g-1,1,m}, z_{g-1,2,m}, \ldots, z_{g-1,l_{g-1},m}]^T$ is an auxiliary variable vector for layer (g-1) regarding data sample m, and $I_{g-1}$ is the number of neurons in the (g-1)-th layer of the NN model.

7. A base station for updating a neural network (NN) model in a neural network (NN) based wireless communication system, the base station comprising:
at least one transceiver;
at least one processor; and at least one memory storing at least one instruction that, when executed, causes the at least one processor to perform operations comprising:

determining a minimal latency T* that makes $\hat{L}^*(T^*)$ no less than an overall model size L of the NN model, where $\hat{L}^*(T^*)$ is an updatable model size for one-round latency T*, wherein determining the minimal latency T* comprises:

selecting i) an upper one-round latency value $T_u$ that makes $\hat{L}^*(T_u)$ larger than L and ii) a lower one-round latency value $T_l$ that makes $\hat{L}^*(T_l)$<L, determining $\hat{L}^*(T_m)$, $\{R^*_{k,n}\}$, $\{L^*_k\}$, and $\{C^*_{k,n}\}$ based on channel gains $\{h_{k,n}\}$ by setting $T_m=(T_u+T_l)/2$ based on $T_u$ being different from $T_l$, where k=1, ..., K, where K is the total number of user equipments to which parameters of the NN model are allocated n=1, ..., N, $R^*_{k,n}$ is channel capacity of user equipment k on subcarrier n, where N is the total number of subcarriers, $L^*_k$ is parameter allocation to user equipment k, and $C^*_{k,n}$ is subcarrier allocation indicator for user equipment k, and $h_{k,n}$ is an uplink channel gain of user equipment k on subcarrier n, setting $T_l=T_m$ based on $\hat{L}^*(T_m)$ being equal to or larger than L and setting $T_l=T_m$ based on $\hat{L}^*(T_m)$ being smaller than L, repeating determining $\hat{L}^*(T_m)$, $\{R^*_{k,n}\}$, $\{L^*_k\}$, and $\{C^*_{k,n}\}$, where $T_m=(T_u+T_l)/2$ based on $T_u$ being different from $T_l$, and determining $T_m$ as T* and outputting $\{R^*_{k,n}\}$, $\{L^*_k\}$, and $\{C^*_{k,n}\}$ for T*, based on $T_u$ being equal to $T_l$;

transmitting, through the at least one transceiver, NN model parameters to user equipments 1 to K based on the output $\{R^*_{k,n}\}$, $\{L^*_k\}$, and $\{C^*_{k,n}\}$ for T*;

receiving, through the at least one transceiver, update results of the NN model parameters from user equipments 1 to K; and updating the NN model based on the received update results.

8. The base station according to claim 7, wherein determining $\hat{L}^*(T_m)$, $\{R^*_{k,n}\}$, $\{L^*_{k,n}\}$, and $\{C^*_{k,n}\}$ comprises:

determining $C^*_{k,n}=0$ based on $I_{k,n}$ being larger than $\mu_n$;

determining $C^*_{k,n} \in (0,1)$ based on $I_{k,n}$ being equal to $\mu_n$ for multiple user equipments; and determining $C^*_{k,n}=1$ based on $I_{k,n}$ being equal to $\mu_n$ for a single user equipment, wherein $$\mu_n = \min_k I_{k,n},$$

wherein $$I_{k,n} = \frac{v_k \sigma^2}{h_{k,n}}\left[\left(2^{R^*_{k,n}/B} - 1\right) - \frac{R^*_{k,n} 2^{R^*_{k,n}/B} \ln 2}{B}\right],$$

where B is a system bandwidth of a cell, and $\sigma^2$ is additive white Gaussian noise power, and $v_k$ is a Lagrange multiplier.

9. The base station according to claim 8, wherein determining $\hat{L}^*(T_m)$, $\{R^*_{k,n}\}$, $\{L^*_k\}$, and $\{C^*_{k,n}\}$ comprises:

determining $\{R^*_{k,n}\}$ based on $$R^*_{k,n} = B\log_2\left(\frac{\lambda_k B}{v_k \tau \ln 2}\right) + B\log\left(\frac{h_{k,n}}{\sigma^2}\right) \quad \text{i)}$$

for all $C_{k,n} \neq 0$, and ii) $R^*_{k,n}=0$ for all $C_{k,n}=0$, wherein is a Lagrange multiplier, and τ is the number of bits per NN model parameter.

10. The base station according to claim 9, wherein determining $\hat{L}^*(T_m)$, $\{R^*_{k,n}\}$, $\{L^*_k\}$, $\hat{L}^*(T_m)$, $\{R^*_{k,n}\}$, $\{L^*_k\}$, and $\{C^*_{k,n}\}$ comprises:

determining $\{L^*_k\}$ based on $L^*_k=[T-\sqrt{v_k T_m + v_k g_k f_k^2 T_m - v_k(P_k T_m - \xi)/f_k}]f_k$, wherein ξ is circuit energy consumption, $g_k$ computation power factor of user equipment k, $g_k$ is computation frequency of user equipment k, and $P_k$ is permitted energy consumption of user equipment k.

11. The base station according to claim 7, wherein $\hat{L}^*(T_m)=\Sigma_{k=1}^{K} L^*_k$.

12. The base station according to claim 7, wherein determining $\hat{L}^*(T_m)$, $\{R^*_{k,n}\}$, $\{L^*_k\}$, and $\{C^*_{k,n}\}$ comprises:

determining $\{L^*_k\}$ based on constraints comprising:

i) allocating $w_{g,i}$ to only one user equipment, where $w_{g,i}$ is the i-th neuron parametric vector in layer g of the NN model; and ii) allocating $Z_m=[z_{i,m}, \ldots, z_{g,m}, \ldots, z_{G,m}]$ to only one user equipment, where $Z_m$ is an auxiliary matrix for data sample m, $z_{g-1,m}=[z_{g-1,1,m}, z_{g-1,2,m}, \ldots, z_{g,1_{g-1},m}]^T$ is an auxiliary variable vector for layer (g−1) regarding data sample m, and $I_{g-1}$ is the number of neurons in the (g−1)-th layer of the NN model.

* * * * *